US012305993B2

(12) United States Patent
Ehmann et al.

(10) Patent No.: US 12,305,993 B2
(45) Date of Patent: May 20, 2025

(54) METHOD FOR CHECKING A TRANSPORT JOURNEY OF A USER BY MEANS OF AN AUTONOMOUSLY DRIVING VEHICLE, AND ELECTRONIC MANAGEMENT SYSTEM

(71) Applicant: Volkswagen Aktiengesellschaft, Wolfsburg (DE)

(72) Inventors: Sebastian Ehmann, Wolfenbüttel (DE); Robin Richter, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 258 days.

(21) Appl. No.: 17/914,171

(22) PCT Filed: Jan. 13, 2021

(86) PCT No.: PCT/EP2021/050579
§ 371 (c)(1),
(2) Date: Sep. 23, 2022

(87) PCT Pub. No.: WO2021/190792
PCT Pub. Date: Sep. 30, 2021

(65) Prior Publication Data
US 2023/0104722 A1 Apr. 6, 2023

(30) Foreign Application Priority Data
Mar. 24, 2020 (DE) .......................... 102020203813.9

(51) Int. Cl.
*G01C 21/34* (2006.01)
*B60W 60/00* (2020.01)
*G06Q 10/02* (2012.01)

(52) U.S. Cl.
CPC ... *G01C 21/3423* (2013.01); *B60W 60/00253* (2020.02); *G01C 21/3415* (2013.01); *G06Q 10/02* (2013.01)

(58) Field of Classification Search
CPC .......... G01C 21/3423; G01C 21/3415; B60W 60/00253; G06Q 10/02
See application file for complete search history.

(56) References Cited

U.S. PATENT DOCUMENTS 10,788,329 B2 * 9/2020 Wu .................... G01C 21/3423
11,835,345 B2 * 12/2023 Vaughn ............. G01C 21/3423
(Continued)

FOREIGN PATENT DOCUMENTS

DE   112016005349 T5   8/2018
DE   102018106364 A1   9/2018
(Continued)

OTHER PUBLICATIONS

PCT/EP2021/050579. International Search Report (Apr. 1, 2021).

*Primary Examiner* — Dale W Hilgendorf
(74) *Attorney, Agent, or Firm* — Peter Zura; LOZA & LOZA, LLP

(57) ABSTRACT

Technologies and techniques for checking a transport journey of a user via an electronics management system. A user books the transport journey at a starting point via an electronic management system, and the transport journey being carried out from the starting point to a destination to be reached. A planned completion of a first route portion of the transport journey is carried out using the autonomously driving vehicle, where a completion of a second route portion of the transport journey is planned and carried out using an alternative means of transportation to the autonomously driving vehicle. The electronic management system checks whether the completion of the second route portion can be carried out using the alternative means of transportation at the transfer point, and if not, the transport journey is continued toward the destination by means of the autonomously driving vehicle.

20 Claims, 3 Drawing Sheets

(56) References Cited

U.S. PATENT DOCUMENTS

| | | | | |
|---|---|---|---|---|
| 11,879,745 B2* | 1/2024 | Dudar | ................ | G01C 21/3602 |
| 2015/0095198 A1* | 4/2015 | Eramian | ............ | G06Q 30/0629 |
| | | | | 705/26.64 |
| 2017/0268891 A1* | 9/2017 | Dyrnaes | .............. | G01C 21/3423 |
| 2018/0268510 A1* | 9/2018 | Edakunni | .............. | H04W 64/00 |
| 2018/0275661 A1* | 9/2018 | Glaser | ................ | G01C 21/3423 |
| 2018/0308064 A1* | 10/2018 | Glaser | ................ | G01C 21/3423 |
| 2018/0326997 A1* | 11/2018 | Sweeney | ............ | G01C 21/3438 |
| 2019/0318277 A1* | 10/2019 | Goldman | ................ | G06Q 10/02 |
| 2020/0042019 A1* | 2/2020 | Marczuk | ................ | G08G 1/202 |
| 2023/0075077 A1* | 3/2023 | Yin | .................... | G01C 21/3461 |

FOREIGN PATENT DOCUMENTS

| | | |
|---|---|---|
| DE | 102018109162 A1 | 10/2018 |
| DE | 102019110184 A1 | 10/2019 |

* cited by examiner

METHOD FOR CHECKING A TRANSPORT JOURNEY OF A USER BY MEANS OF AN AUTONOMOUSLY DRIVING VEHICLE, AND ELECTRONIC MANAGEMENT SYSTEM

RELATED APPLICATIONS

The present application claims priority to International Patent App. No. PCT/EP2021/050579 to Ehmann, et al., titled "Method For Checking A Transport Journey Of A User By Means Of An Autonomously Driving Vehicle, And Electronic Management System", filed Jan. 13, 2021, which claims priority to German Patent App. No. 10 2020 203 813.9, filed on Mar. 24, 2020, the contents of each being incorporated by reference in their entirety herein.

TECHNICAL FIELD

The present disclosure relates to technologies and techniques for checking a transport journey of a user, wherein the transport journey is booked by the user via an electronic management system for a future pick-up time at a starting point from which the user is picked up by an autonomous vehicle. The transport journey is carried out starting at the starting point to a destination to be reached. A planned completion of a first route portion of the transport journey, which extends from the starting point to a transfer point, is implemented by means of the autonomously driving vehicle, it being planned that a completion of a second route portion of the transport journey, which extends from the transfer point to the destination, is implemented by means of an alternative means of transportation to the autonomously driving vehicle.

The present disclosure furthermore relates to an electronic management system comprising an evaluation unit.

BACKGROUND

Autonomous taxis can play a major role in the world of traffic in the future. It is predicted that users will routinely order an autonomously driving taxi to be driven from one location to another location. One frequent application will be that the user orders the autonomously driving taxi to come to a train station or an airport to be able to continue from there using another means of transportation. However, if the connection does not materialize, the user possibly drove in vain or requires an alternative connection. It is disadvantageous in the process when no alternative route planning or needs planning of the autonomously driving taxi is offered to the user.

DE 10 2018 106 364 A1 discloses a multi-mode transportation system in which a scheduler service generates an initial transportation schedule including a list of transport legs where the transport over one or more transport legs takes place by means of an autonomous vehicle from an initially scheduled pick-up time.

DE 10 2018 109 162 A1 discloses a multi-mode transportation management method. A transportation request for a passenger is processed, identifying a starting location, a destination, and vehicle information. A travel plan is created, which includes a vehicle segment and at least one additional segment, for example. The travel progress of the passenger is monitored in the process.

SUMMARY

Some aspects of the present disclosure are to process a planned trip of a traveler by means of an autonomously driving vehicle on a more comprehensive scale in that a travel route can be planned and implemented, regardless of connections and/or transfer points.

Aspects relating to a method and an electronic management system are disclosed in the independent claims. Additional and/or alternate aspects are disclosed in the dependent claims.

One aspect of the present disclosure relates to a method for checking a transport journey of a user, the transport journey being booked by a user via an electronic management system for a future pick-up time at a starting point, where the user is picked up by an autonomously operated vehicle. The transport journey is carried out starting from the starting point to a transfer point to be reached, a planned completion of a first route portion of the transport journey, which extends from the starting point to a transfer point, being implemented by means of the autonomously driving vehicle. A completion of a second route portion of the transfer journey is planned, which extends from the transfer point to the destination, and implemented by means of an alternative means of transportation to the autonomously driving vehicle. At least at a point in time after the planning process by the electronic management system, it is checked whether the completion of the planned second route portion can be implemented by means of the alternative means of transportation starting at the transfer point, the transport journey toward the destination by means of the autonomously driving vehicle being continued if the alternative means of transportation is not available at the transfer point. A campaign is then started and/or implemented, in particular by way of the electronic management system, which initiates the transport journey toward the destination by means of the autonomously driving vehicle. At least one electronic signal is thus generated by the electronic management system, which initiates this transport journey toward the destination by means of the autonomously driving vehicle. For example, the autonomously driving vehicle can thus be informed that it now also intended to carry out this transport journey toward the destination.

Aspects of the present disclosure also encompasses refinements of the electronic management system that include features such as those described below.

The present disclosure also encompasses the combinations of the features of the described embodiments.

An exemplary embodiment of the present disclosure is described hereafter. For this purpose, the following FIG. 1 to FIG. 6 show different examples of the method according to the present disclosure.

The exemplary embodiment described hereafter are preferred embodiment of the present disclosure. In the exemplary embodiment, the described components of the embodiment in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described embodiment may also be supplemented with additional of the above-described features of the present disclosure.

In the figures, functionally equivalent elements are each denoted by the same reference numerals.

BRIEF DESCRIPTION OF THE DRAWINGS

The following figures show individual exemplary embodiments. Different options are shown as to what, specifically, the transport journey of the user looks like, and how the electronic management system behaves in each case.

DETAILED DESCRIPTION

Figure 1:
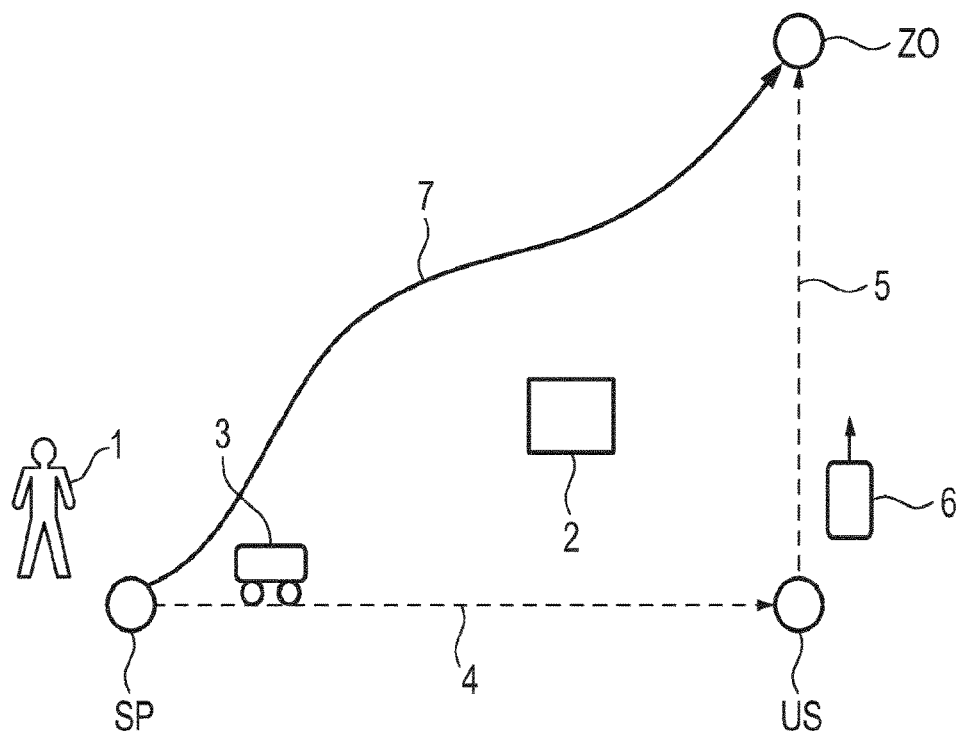
FIG. 1 describes a general sequence of a method under some aspects of the present disclosure.

In the examples provided herein, a user may be ensured that a booked and desired transport journey may be executed, even in the event of unforeseeable and unpredictable situations. For example, the transport journey of the user can be carried out independently of the alternative means of transportation at the transfer point since, in the case of potentially occurring situations, the user can still be driven to the destination, even if the alternative means of transportation does not materialize at the transfer point. Using the described method, it is conceivable that the user exclusively carries out the transport journey by means of the autonomously driving vehicle when alternative means of transportation are not available at the transfer point. In this way, the user can in particular keep a scheduled appointment at the destination, despite the alternative means of transportation not materializing at the transfer point, since in this case the transport journey is exclusively continued by means of the autonomously driving vehicle, so that the user arrives at the destination as scheduled.

In some examples, the electronic management system is designed to detect and evaluate a wide variety of input variables with respect to the transport journey. The electronic management system can thus transmit corresponding output variables to the user of the transport journey and, for example, output these via output units. The transport journey is in particular monitored by the electronic management system in real time so that the electronic management system monitors the plans regarding the completion of the first and/or second route portions at all times. If a change occurs, the electronic management system is thus able to carry out appropriate calculations. In this way, it is possible to promptly ascertain and recognize the alternative means of transportation not being available at the transfer point, and to promptly generate a corresponding signal. The signal can subsequently be transmitted to the autonomously driving vehicle and, in particular, to an electronic device of the user.

In this way, the autonomously driving vehicle can, for example, inform the user, in particular with the aid of the transmitted signal, that the alternative means of transportation is not available, and that the transport journey toward the destination is continued by means of the autonomously driving vehicle. For example, after establishing that the planned second route portion cannot be implemented by means of the alternative means of transportation at the transfer point, the electronic management system can generate a corresponding signal, so that the generated signal can be transmitted to a control unit, in particular to a guidance system and/or a navigation system of the autonomously driving vehicle. As a function of the signal generated by the electronic management system, the autonomously driving vehicle can thus calculate a route so that the transport journey toward the destination can be continued.

The user can, for example, electronically book and confirm the transport journey via an input unit of the electronic management system for the future pick-up time at the starting point. For example, the electronic management system can relay a corresponding confirmation message to the user, sending it to a portable communication device of the user. For example, the starting point can be the home of the user and/or the workplace of the user, or a future position of the user and/or a geographical location desired by the user. The electronic management system in particular transmits a corresponding control signal to the autonomously operated vehicle, so that the autonomously operated vehicle can be maneuvered autonomously to the desired starting point by the pick-up time with the aid of the control signal. The autonomously operated vehicle is in particular an autonomous vehicle comprising a Level 4 or Level 5 automation system. In this way, the autonomously operated vehicle can be independently operated in a fully autonomous manner.

Using the electronic management system, the user in particular enters not only the desired starting point, but also the destination to be reached, in particular the geographical location or the geographical position of the destination, via the electronic input system of the electronic management system. In particular, the user himself or herself, or the electronic management system, can automatically define a first route portion that must be completed first during the transport journey to be carried out. The first route portion is in particular a planned travel course of the transport journey. The first route portion in particular extends from the starting point to a transfer point. The transfer point is in particular not the destination, but is situated around a site between the starting point and the destination. The transfer point can, for example, be a train station or an airport or a bus terminal or a stopover.

In particular, the user is transported automatically, and in particular autonomously, from the starting point to the transfer point with the aid of the autonomously driving vehicle. In particular, the second route portion of the transport journey is planned with the aid of the electronic management system and/or the user. In particular, the second route portion is a route from the transfer point to the destination. In particular, it is planned that the second route portion of the transport journey is implemented by means of an alternative means of transportation to the autonomously driving vehicle. The alternative means of transportation can be, for example, an airplane or a ship or a bus or a train or a watercraft or a means of transportation capable of flying. In particular, it is planned with the aid of the electronic management system that the user has to transfer from the autonomously driving vehicle to the alternative means of transportation upon reaching the transfer point, so that the transport journey is continued on the route portion with the aid of the alternative means of transportation.

In some examples, the electronic management system includes an evaluation unit, that may continually check whether the planned completion of the second route portion can be implemented by means of the alternative means of transportation. The planning process is checked to determine as to whether the user is able to utilize the alternative means of transportation, upon reaching the transfer point by means of the autonomously driving vehicle. If the alternative means of transportation should not be available at the transfer point, e.g., when the user arrives at the transfer point, this is ascertained by the evaluation unit of the electronic management system. To that effect, the evaluation unit of the electronic management system can automatically carry out a corresponding evaluation and a new planning process. As a result, the electronic management system can transmit a signal and/or a corresponding message to the user, and in particular to the autonomously driving vehicle, so that the user and the autonomously driving vehicle can prepare to the effect that the transport journey toward the destination will now be continued by means of the autonomously driving vehicle.

The electronic management system can, for example, be a server or a cloud or a processing unit or a central information system or a means of transportation or a transportation means management system.

In some examples, the electronic management system, prior to the transfer point being reached, recognizes that the alternative means of transportation is not available, wherein alternative suggestions are created by the electronic management system as a function of the point in time at which the reached travel status is recognized. In this way, when the user has already been picked up by the autonomously operated vehicle and is situated on the first route portion of the transport journey, alternative suggestions for continuing the transport journey toward the destination can promptly be provided to the user and/or the autonomously operated vehicle by the electronic management system. In this way, the user can in particular be offered a number of alternative travel options or travel routes for reaching the desired destination. For example, the user can select the appropriate alternative suggestion via an input unit or via a portable communication device, so that this suggestion can be implemented by the autonomously driving vehicle, for example. Likewise, the user can transmit the particular selected alternative suggestion to the electronic management system via a communication link, so that the electronic management system carries out further steps and measures, or can forward or detect additional information.

With the aid of the evaluation unit of the electronic management system, it is possible, for example, to check the availability of the alternative means of transportation automatically prior to the transfer point being reached. For this purpose, the electronic management system can, for example, automatically retrieve information from other systems, such as for example traffic management systems and/or traffic authorities and/or news agencies. In this way, the electronic management system can automatically process a wide variety of information and forecast or generate corresponding results. In this way, it is possible for the user to continue the transport journey toward the destination without losing time while traveling on the first route portion, despite the alternative means of transportation being cancelled.

Preferably, it is provided that the electronic management system recognizes, after the transport journey has been booked and before the transport journey has been started, that the alternative means of transportation is not available at the transfer point, wherein a travel route to the destination that is independent of the first route portion and the second route portion is then determined as an alternative suggestion, which can be completed entirely by means of the autonomously driving vehicle. In this way, information or a message can be provided to the user at an early stage, so that the user, for example, does not complete the first route portion by means of the autonomously driving vehicle in vain. In this way, a best possible time utilization can in particular be presented for the user. As a result of the electronic management system checking at an early stage, prior to the transport journey being actually carried out, whether the alternative means of transportation is available at the transfer point, it is possible for the electronic management system to electronically ascertain and determine a section or travel route that is adapted to the new situation, independently of the first route portion and the second route portion. In this way, an optimal trip of the user to the desired destination may be offered and carried out.

The generated alternative suggestion may be offered by the electronic management system to the user, via a portable communication device (e.g., a smart phone or a tablet), and can be provided in a selectable format. In this way, the user can decide whether the alternative suggestion is desired by the user or whether the alternative suggestion is unfavorable, so that the user can accept or reject the alternative suggestion. If the user should accept the alternative suggestion, the user can be picked up at a desired pick-up position, so that the travel route to the destination is completed or driven entirely by the autonomously driving vehicle.

In some examples, an autonomously driving vehicle that is specific to the travel route is sought and offered by the electronic management system. If the user should accept the proposed alternative suggestion for implementing the travel route to the destination, it is possible to seek and select an autonomously operated vehicle that is tailored or matched exactly to this travel route, for example by way of the evaluation unit of the electronic management system. In particular, the autonomously driving vehicle is sought, for example, as a function of the travel duration and/or the travel length and/or the travel distance and/or the road or route conditions and/or, for example, a comfort desire of the user, and is provided to the user for implementing the travel route. In this way, the user can be picked up by an autonomously operated vehicle that is tailored to the travel route and his or her travel needs, and can be transported to the destination. It is likewise possible for the electronic management system to propose multiple vehicle kinds and/or vehicle models for implementing the travel route. In this way, the user can accept the respective desired vehicle, or reject a proposed vehicle type.

It is preferably provided that the electronic management system, during the completion of the first route portion by means of the autonomously driving vehicle, recognizes that the alternative means of transportation is not available, wherein alternative suggestions for reaching the destination are created by the electronic management system as a function of the travel status, along the first route portion, that has been reached by this point in time of recognition. After the user has been picked up at the starting point and when the first route portion is already being negotiated by the autonomously driving vehicle, it is automatically checked by the electronic management system whether the alternative means of transportation is available at the transfer point. If the alternative means of transportation should not be available at the transfer point, the electronic management system can determine and calculate an alternative travel route for reaching the destination. During the calculation of the alternative travel route, the respective current position of the autonomously driving vehicle along the first route portion is taken into consideration. In this way, it is possible, for example, to offer alternative suggestions to the user, which can each be implemented from the current position of the autonomously driving vehicle on the first route portion. In this way, several suggestions for reaching the destination can be presented to the user promptly after it has been recognized that the alternative means of transportation is not available. The user can thus accept or reject the respective suggestions. If the user should accept one of these suggestions, the trip can be promptly continued from the current position of the autonomously driving vehicle on the first route portion so as to reach the destination.

In some examples, a travel route may be planned from the travel status to the destination by the electronic management system, which can be implemented entirely by means of the autonomously driving vehicle. A corresponding travel route is calculated or planned with the aid of the electronic management system, and with the aid of the evaluation unit of the electronic management system, as a function of the current position of the autonomously driving vehicle. The travel route is planned with the aid of the electronic management system so that the transport journey to the destination can be carried out entirely by means of the autonomously driving vehicle, as a function of the destination and the current location of the autonomously driving vehicle. It is possible, for example, to take fueling options or charging options along the travel route into consideration for reaching the destination, and to reserve these in advance. The travel route may be planned so that the user is able to reach the destination as conveniently as possible, and without major time delays.

When the process of planning the travel route is completed, the vehicle status is checked with respect to the vehicle having another booking and/or with respect to the remaining range of the vehicle, and/or the user criteria, wherein the travel route is determined by the electronic management system as a function of the vehicle status and/or the user criteria. In this way, it can be ensured that the travel route to the destination can be efficiently implemented, so that the user can reach the destination as quickly as possible. The evaluation unit of the electronic management system can automatically generate corresponding information, based on a wide variety of criteria and/or the vehicle status. The electronic management system can automatically retrieve all of the aforementioned criteria and ascertain corresponding results using appropriate software tools and/or algorithms. In some examples, the current vehicle status of the autonomously driving vehicle is checked when the planning is being implemented. It is checked in the process whether the autonomously driving vehicle is in a position to be able to implement the destination without major stopovers and/or repairs. Also, the current tank level or the charging level of an energy store of the autonomously driving vehicle is checked as to whether the destination can be reached. If necessary, it is possible to ascertain and reserve fueling options and/or charging options along the route to the destination by means of the electronic management system. It is also possible under the present disclosure to take appointments and/or interests and/or points of interest of the user into consideration during the planning process of the new travel route by means of the electronic management system. If necessary, the electronic management system can access an electronic user profile of the user so as to be able to adapt the travel route to the user in the best possible manner.

In further advantageous embodiments of the present disclosure, it is provided that it is being checked, in particular continuously or as a function of trigger criteria, by the electronic management system, while the autonomously driving vehicle is negotiating the travel route, whether an alternative transfer point to a further alternative means of transportation is possible as a function of the respective current position of the autonomously driving vehicle, so as to be able to reach the destination by means of the alternative means of transportation. In this way, it is possible for the electronic management system, for example while the travel route which is created and negotiated as an alternative to the first route portion and the second route portion is being negotiated, to continually check whether an alternative transfer point to the first transfer point is present along the new travel route, which would take the user, for example, to the destination more comfortably and/or more quickly.

In the process, however, it may be determined that the alternative means of transportation of the transfer point is not being offered. Thus, different, further alternative means of transportation is sought to a transfer point and the alternative means of transportation. The alternative means of transportation that is provided is not the same as that at the transfer point. An alternative means of transportation of the same kind and/or of the same type as the alternative means of transportation at the transfer point is sought. For example, the alternative means of transportation can be a train at the transfer point, which is a train station. In this way, it is possible, for example, for the electronic management system to ascertain at the alternative transfer point, such as another train station, an alternative train to the first train at the first transfer point. In this way, the user can utilize the originally planned alternative means of transportation, such as a provided means of transportation that is similar thereto, for a remaining course of the travel route to the destination, despite the newly calculate travel route already being negotiated. In particular, this may be only offered by means of the electronic management system when it is useful as a function of the current position of the autonomously driving vehicle, and in particular quicker for reaching the destination.

The electronic management system, upon recognizing that the alternative means of transportation is not available at the transfer point, creates alternative suggestions for reaching the destination, which automatically determines the travel duration and/or the travel path and/or the deviation of the arrival time at the destination from the planned arrival at the destination by means of the alternative means of transportation. In this way, the user can be provided with a best-possible alternative travel route to the desired destination. In particular, the electronic management system takes a number of criteria and requirements for the alternative suggestion into consideration, and takes these into considered when generating the new travel route. The alternative suggestions are in particular created so that the destination can be reached as quickly as possible, despite the alternative means of transportation not materializing. In particular, the travel duration and the travel path and/or a deviation of the arrival time at the destination are taken into consideration by the electronic management system when generating the alternative suggestions or alternative travel route, so that the transport journey to the destination can be offered and carried out as pleasantly and quickly as possible for the user.

Another aspect of the present disclosure relates to an electronic management system comprising an evaluation unit, the electronic management unit being designed to carry out a method according to any one of the above-described aspects or a refinement thereof. Thus, the aforementioned electronic management system may be utilized to carry out the method according to any one of the aspects disclosed herein.

In some examples, the transport journey, when the electronic management system recognizes that the alternative means of transportation is not available, is completed entirely by means of the autonomously driving vehicle, regardless of the position of the autonomously driving vehicle on the first route portion, so that the transport journey to the destination can be continued by means of the autonomously driving vehicle, the autonomously driving vehicle being automatically informed by the electronic management system to also complete the remaining travel distance to the destination.

In some examples, the transport journey, when the electronic management system recognizes that the alternative means of transportation is not available, is completed by means of the autonomously driving vehicle, regardless of the position of the autonomously driving vehicle on the first route portion, so that the transport journey to the destination is at least partially continued by means of the autonomously driving vehicle. The autonomously driving vehicle is automatically informed by the electronic management system to also complete the remaining travel distance to the destination, it being automatically checked by the electronic management system, in particular continuously or as a function of starting parameters, during the completion of the travel distance to the destination by means of the autonomously driving vehicle, whether an alternative transfer point to a further alternative means of transportation is possible for the autonomously driving vehicle, in particular as a function of the current position.

In some examples, a corresponding autonomously driving vehicle may be selected by the electronic management system among a plurality of autonomously driving vehicles at a point in time prior to the pick-up time as a function of a travel distance of the second route portion, when the electronic management system recognizes that the alternative means of transportation is not available.

In some examples, it is checked by the electronic management system, at a point in time after the user has been picked up by the autonomously driving vehicle, whether the destination to be reached is reachable by means of the autonomously driving vehicle, if it has been electronically confirmed by the electronic management system that the alternative means of transportation is not available. An amount of energy of an energy store of the autonomously driving vehicle is checked by the electronic management system as to whether the destination can be reached using the current amount of energy of the energy store. If the current amount of energy of the electric energy store of the autonomously driving vehicle is not sufficient, the electronic management system determines at least one energy requirement provision device along a route of the second route portion and/or the alternative route and provides this to the user for selection.

It is likewise conceivable that, when the destination cannot be reached by means of the autonomously driving vehicle, the transport journey is aborted by the electronic management system or the user, and the user is returned to the starting point again by means of the autonomously driving vehicle.

In some examples, a user may plan a trip using an autonomously driving taxi and a connection (for example rail, flight, bus). For this purpose, the user not only orders the autonomously driving taxis, but additionally indicates which connection he or she intends to subsequently reach by means of the autonomously driving taxi. In addition, the user can indicate what is to happen if the connection does not materialize or is delayed. For example, the autonomously driving taxi can respond. An alternative connection at a different point in time is sought, and the driver receives a notification that the pick-up time has changed. If needed, the system can rebook the connection. Likewise, for example, an alternative connection from a different train station may be sought. The driver receives a notification that the pick-up time may have changed and an alternative connection is planned. If needed, the system can automatically rebook the connection. Otherwise, the section can be implemented entirely by means of the autonomously driving taxi. An autonomously driving taxi having a greater range and more extensive comfort features can be selected. It is also conceivable for multiple users to share a taxi for the longer section. If needed, connection tickets are cancelled automatically. For example, the driver receives a notification that the taxi is not coming since there is no alternative connection. The autonomously driving taxi can now automatically be scheduled otherwise by the system. It is also conceivable that the user provides an autonomously driving taxis for an appointment that is stored in his or her digital personal calendar. If this appointment is canceled, the booking responds automatically. It is conceivable that the journey is dispensed with or the user communicates the cancellation directly. In the case of journeys shared with multiple people, the route planning can thus also possibly be changed since one or more additional stops would be eliminated. This change can be electronically relayed to other passengers.

FIG. 1 shows a first exemplary embodiment of the described present disclosure. A user 1 books a transport journey via an electronic management system 2 for a future pick-up time at a starting point SP, at which the user 1 is picked up by an autonomously operated vehicle 3. The booking can be implemented via an electronic input unit or a portable communication terminal of the user 1. The destination ZO to be reached is entered by the user 1 via the electronic management system 2 or is communicated to the electronic management system 2.

After the transport journey has been booked by the user 1, the electronic management system 2 can plan a first route portion 4, which extends from the starting point SP to a transfer point US. The first route portion 4 is in particular implemented or completed by means of the autonomously driving vehicle 3. The starting point SP can be, for example, a desired pick-up location of the user or a home of the user 1. The transfer point US can be, for example, a train station or a bus terminal or an airport or a port or another traffic stopover. It is likewise planned by means of the electronic management system 2 that a second route portion 5 of the transfer journey, which extends from the transfer point US to the destination ZO, is completed by means of an alternative means of transportation 6 to the autonomously driving vehicle 3, The alternative means of transportation 6 can be, for example, an airplane, a tram, a ship, a ferry, a train or a vehicle capable of flying. Further examples of alternative means of transportation are likewise conceivable. In particular, the transport journey is generally planned by the electronic management system 2 so that the user 1 is picked up from the starting point SP and transported to the transfer point US. At the transfer point US, the user 1 can then be transported or driven to the destination ZO with the aid of the alternative means of transportation 6.

In some examples, electronic management system 2, which is configured as a server, a traffic management system or a cloud, for example, continually and continuously checks whether the planned second route portion 4 can be completed by means of the alternative means of transportation 6, starting at the transfer point US. This takes place at a point in time after the user 1 has planned and booked the transport journey. If the alternative means of transportation 6 should not be available, an alternative is automatically intelligently determined with the aid of the electronic management system 2. In particular, the availability of the alternative means of transportation 6 is checked intelligently and automatically by the electronic management system 2. In the process, the electronic management system 2 can take past information, stored information, information determined on its own, or information from further systems into consideration for the check, and generate conclusions therefrom.

If the electronic management system 2 should now have intelligently and automatically established that the alternative means of transportation 6 is not available, it is possible, as is apparent in FIG. 1, to generate and ascertain a travel route 7 as an alternative for implementing a transport journey. In this exemplary embodiment, the travel route 7 is in particular generated independently of the first route portion 4 and the second route portion 5. In this exemplary embodiment, the transport journey of the user 1 in particular takes place directly from the starting point SP via the travel route 7 to the destination ZO. As a result, the user 1 can be transported promptly and on the fastest direct path from the desired starting point SP to the destination ZO, even if the alternative means of transportation 6 fails to materialize.

For example, the electronic management system 2 can automatically and intelligently offer different alternative suggestions to the user 1 and show when the alternative means of transportation 6 is not available. For example, information of the user 1 and/or of an electronic user profile of the user 1 or appointments and/or interests and/or points of interest of the user 1 can be taken into consideration when generating the alternative suggestions for the travel route 7.

The user can in particular select one of the proposed alternative suggestions for the travel route 7 via an input unit and/or via his or her portable communication terminal. The user 1 likewise has the option of selecting none of the proposed alternatives. In this case, the user 1 can establish, for example, that the transport journey to the destination ZO will not take place and will be aborted.

Figure 2:
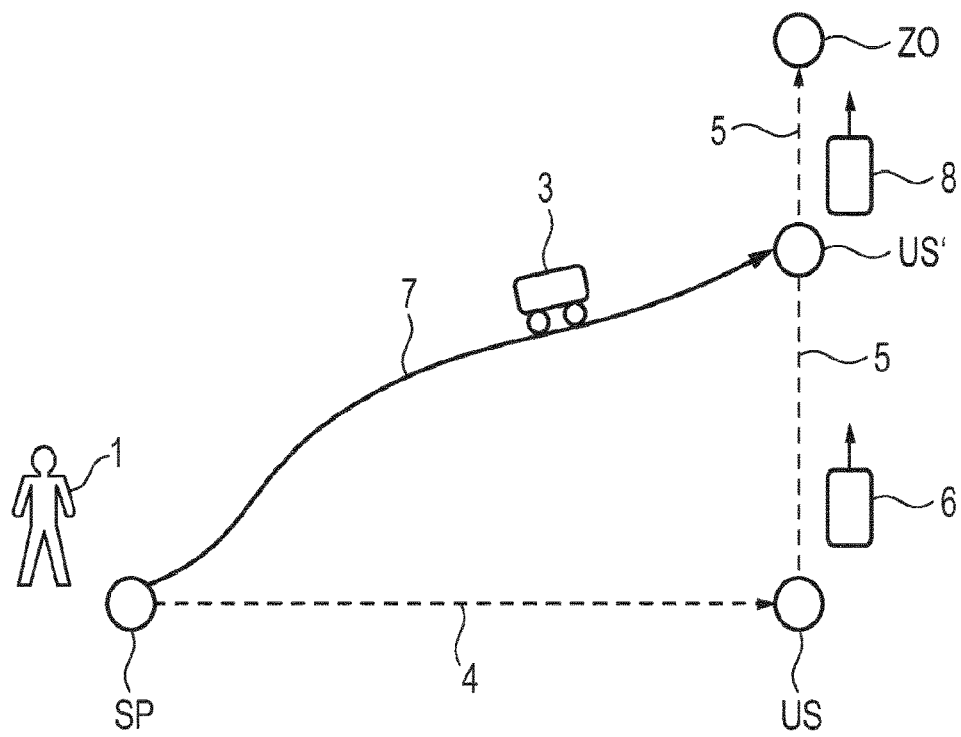
FIG. 2 describes general sequence of another method under some aspects of the present disclosure.

FIG. 2 describes another exemplary embodiment, and builds on the example provided in FIG. 1. When the user 1 has selected one of the alternative suggestions for the travel route 7 and is already in the process of negotiating the travel route 7 toward the destination ZO, the electronic management system 2 can independently and automatically check in an intelligent manner, and in particular continuously, whether the current course of the travel route 7 is still the fastest and best way for reaching the destination ZO. In particular, the electronic management system 2 can carry out checks and queries dynamically and continuously. For example, the electronic management system 2 can check, continuously and/or as a function of trigger criteria, whether an alternative transfer point US' to a further alternative means of transportation 8 is possible, in particular as a function of the respective current position of the autonomously driving vehicle 3, and in particular whether this is useful for reaching the destination ZO by means of this alternative means of transportation 8. In the process, it is in particular taken into consideration whether the destination ZO can be reached more quickly by this further alternative means of transportation 8 than when using the travel route 7.

The further alternative means of transportation 8 is in particular not the same alternative means of transportation 6. However, the kind of the alternative means of transportation 8 can be identical to the kind of the alternative means of transportation 6. The transfer point US' is likewise not the same transfer point US. Only the kind of the transfer point US' may be identical to that of the transfer point US. Should the electronic management system 2 have established dynamically and automatically that the further alternative transfer point US' is useful, the user 1 is transported to this alternative transfer point US' with the aid of the autonomously driving vehicle 3. Once he or she has arrived there, the user 1 can transfer to the further alternative means of transportation 8 and implement an alternative further section to the destination ZO. For example, the further section can be a subarea of the second route portion 5.

Figure 3:
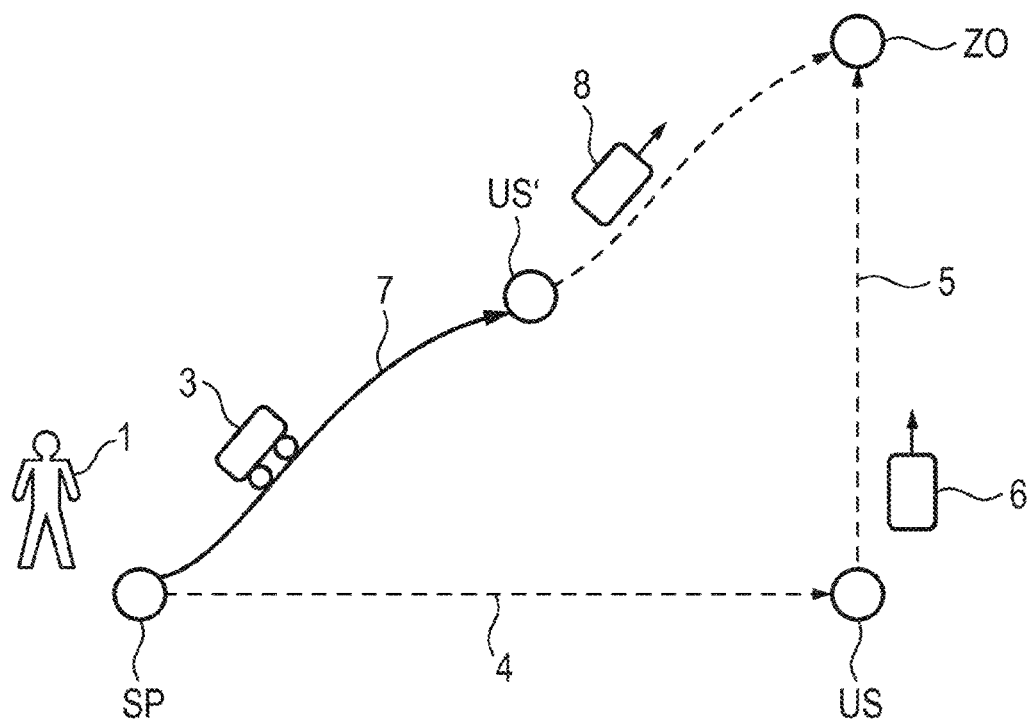
FIG. 3 describes general sequence of a further method under some aspects of the present disclosure.

FIG. 3 shows a further exemplary embodiment in which the travel route 7 is determined and provided by the electronic management system 2 independently of the first route portion 4 and the second route portion 5. In this embodiment, the autonomously driving vehicle 3 is also already on the travel route 7 toward the destination ZO. Again, the electronic management system 2 can check, in particular check continuously and automatically, whether the one alternative transfer point US' along the travel route 7 is available, and whether a transfer at the transfer point US' is useful. The electronic management system 2 in particular checks dynamically and intelligently whether the user 1 can be transported to the destination ZO more quickly and more efficiently when transferring at the transfer point US'. If this is the case, the electronic management system 2 can accordingly generate new instruction information and control signals, which are transmitted to the user 1, and in particular to the autonomously driving vehicle 3. In this way, the user 1 is transported by the autonomously driving vehicle 3 to the new alternative transfer point US', where the user 1 can transfer to the further alternative means of transportation 8 so as to reach the destination ZO with the aid thereof.

Figure 4:
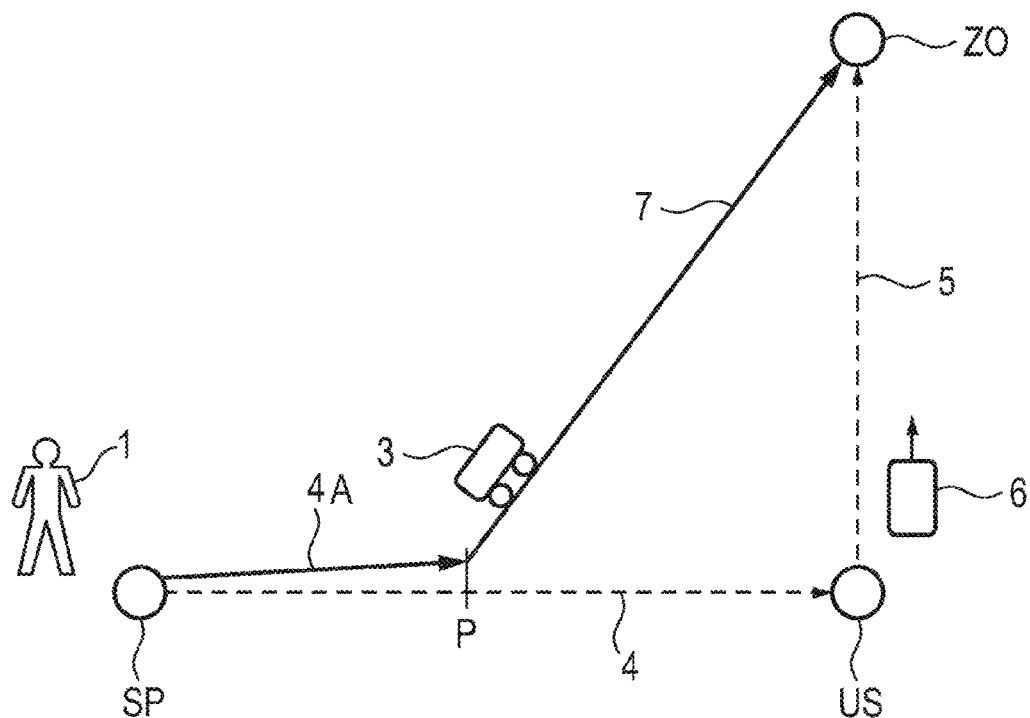
FIG. 4 describes general sequence of a still further method under some aspects of the present disclosure.

FIG. 4 shows in an exemplary embodiment where the autonomously driving vehicle 3 is already situated on the first route portion 4, starting from the starting point SP. In the process, the electronic management system 2 can check, likewise continuously and automatically, whether the alternative means of transportation 6 is available at the transfer point US. This occurs in particular automatically by the electronic management system 2 prior to the transfer point US being reached. If the electronic management system 2 should now establish that the alternative means of transportation 6 is not available, it is also possible, as a function of the travel status of the autonomously driving vehicle 3 that has been reached by this point in time of recognition, to create alternative suggestions for a modified route portion 4A (extending from SP to P) and to offer these to the user 1. From point P, the alternative travel route 7 is generated by the electronic management system 2 so that the autonomously driving vehicle 3 can continue the transport journey toward the destination ZO. This does not result in any major time delay for the user 1 since the autonomously driving vehicle 3 can be controlled from the current position, along the alternative travel route 7, directly to the destination ZO.

Figure 5:
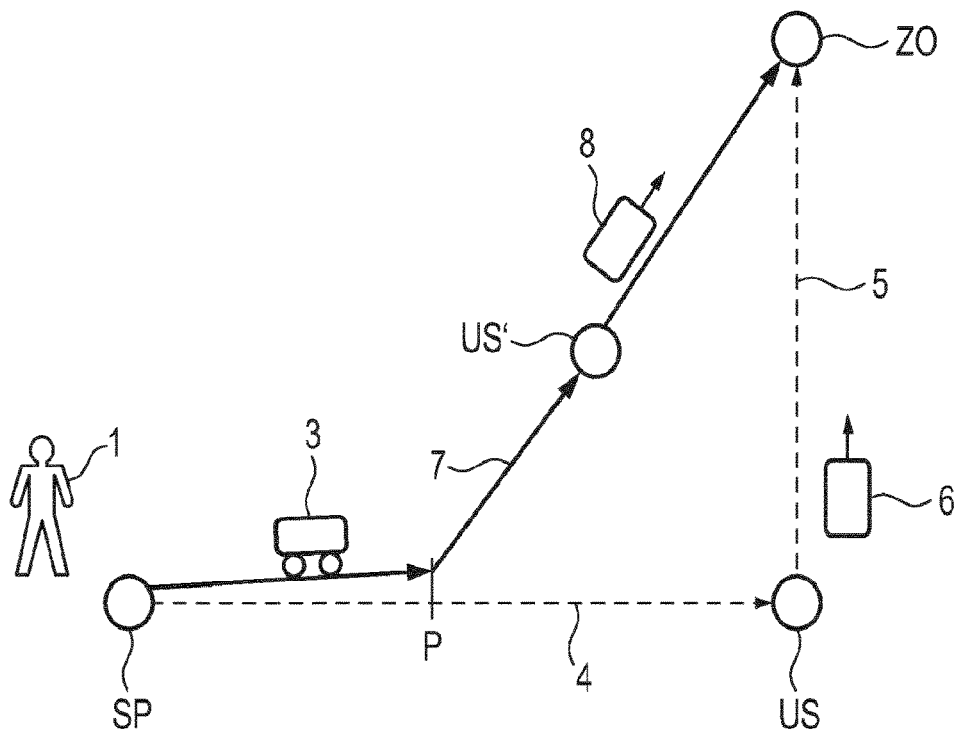
FIG. 5 describes a general sequence of a still further method under some aspects of the present disclosure.

FIG. 5 shows a further exemplary embodiment, where the autonomously driving vehicle 3 is already moving along the first route portion 4, after establishing that the alternative means of transportation 6 is not available. It is now possible for the electronic management system 2 to automatically check whether a travel route 7 toward the destination ZO should be generated and determined, as a function of the current position of the autonomously driving vehicle 3 on the first route portion 4, and whether it is additionally useful to head for a further alternative transfer point US' along this new travel route 7. Proceeding from the point P, the user 1 can be transported on the first route portion 4 toward the transfer point US', and at this transfer point US', the user 1 can transfer to an alternative means of transportation 8, which does not encompass the same, but the same kind of the originally booked alternative means of transportation 6.

In this way, the user 1 can nevertheless implement the remaining portion or the remaining sub-leg to the destination ZO by means of the booked and desired alternative means of transportation 6, 8. In this way, the transport journey can be dynamically adapted by the electronic management system 2 to the customer request of the user 1 at any time in the best possible manner.

Figure 6:
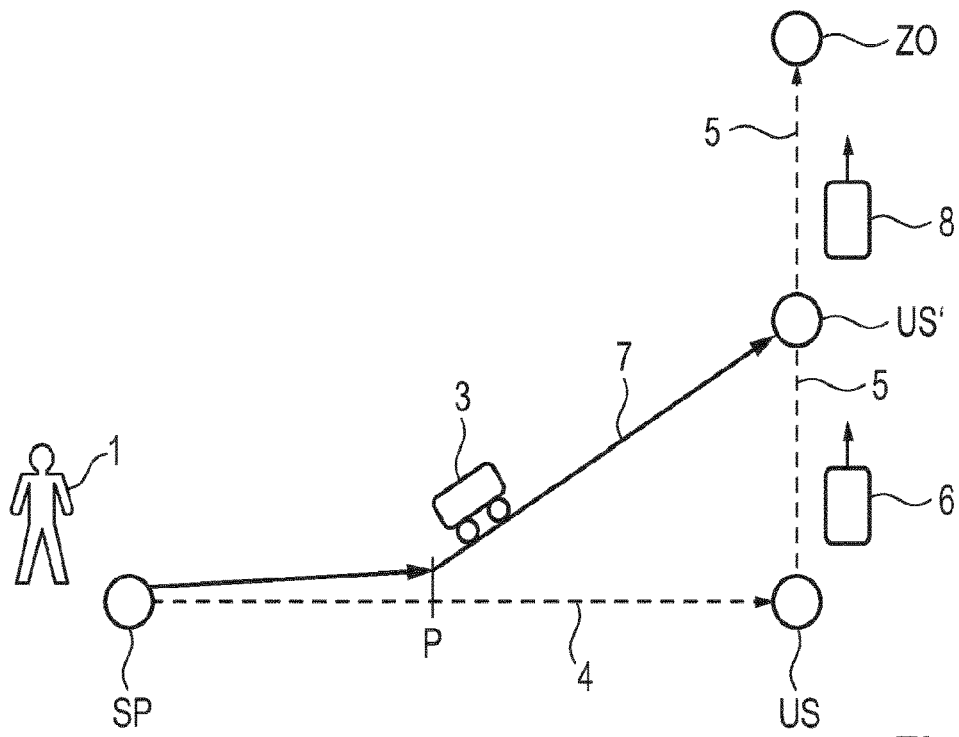
FIG. 6 describes a general sequence of a still further method under some aspects of the present disclosure.

FIG. 6 now shows a further exemplary embodiment, wherein here, in contrast to the exemplary embodiment in FIG. 5, it was determined by the electronic management system 2 that the alternative transfer point US' is likewise situated along the originally planned second route portion 5. In this way, the created alternative travel route 7 is calculated by the electronic management system 2, from the current position of the autonomously driving vehicle 3 along the first route portion 4 to this new alternative transfer point US'. With the aid of the autonomously driving vehicle 3, the user 1 is transported along the travel route 7 to the alternative transfer point US' so that the user 1 can transfer to the further alternative means of transportation 8. The alternative means of transportation 8 cannot be the same alternative means of transportation 6, but can be of the same kind. In this way, the user 1 can also implement the remaining course of the transport journey to the destination ZO by means of an alternative means of transportation 6, 8 that differs from the autonomously driving vehicle 3.

Further, particularly advantageous embodiments of the described present disclosure are not only possible in the aforementioned exemplary embodiments, but also in many other variations and combinations.

LIST OF REFERENCE NUMERALS

1 user
2 electronic management system
3 autonomously driving vehicle
4 first sub-leg
5 second sub-leg
6 alternative means of transportation
7 travel route
8 further alternative means of transportation
SP starting point
US transfer point
US' further transfer point
P point along the first route portion
ZO destination

The invention claimed is:

1. A method for checking a transport journey of a user, comprising:
    receiving a transport journey booking in an electronic management system for a future pick-up time at a starting point to a destination point for an autonomously operated vehicle;
    determining a planned completion of a first route portion of the transport journey, which extends from the starting point to a transfer point for the autonomously operated vehicle;
    determining a planned completion of a second route portion of the transfer journey, which extends from the transfer point to the destination point for the autonomously operated vehicle;
    determining, at least at a point in time after the planning completion of the first and second route portions, whether the completion of the planned second route portion can be carried out by an alternative transportation source, starting at the transfer point; and
    activating the autonomously operated vehicle to operate using the transport journey booking, wherein the autonomously operated vehicle is configured to continue the transport journey toward the destination point if the alternative transportation source is not available at a point in time prior to the transfer point being reached.

2. The method according to claim 1, further comprising:
    recognizing, via the electronic management system, at the point in time prior to the transfer point being reached, that the alternative transportation source is not available, and generating, in response, alternative routes via the electronic management system as a function of a current travel status of the autonomously operated vehicle at the point in time when the unavailability of the alternative transportation source is recognized.

3. The method according to claim 2, further comprising:
    determining, via the electronic management system, after the transport journey has been booked and before the transport journey has been started, that the alternative routes of transportation are not available at the transfer point; and
    determining an alternative route to the destination point that is independent of the first route portion and the second route portion, wherein the alternative route can be completed entirely via the autonomously operated vehicle.

4. The method according to claim 3, further comprising: activating the autonomously operated vehicle to operate using the alternative route.

5. The method according to claim 2, wherein the alternative routes are determined by the electronic management system as the function of the current travel status of the autonomously operated vehicle that was determined at the point in time when the unavailability of the alternative transportation source is recognized.

6. The method according to claim 5, further comprising: determining a travel route from the travel status to the destination point via the electronic management system, wherein the travel route is configured to be implemented entirely via the autonomously operated vehicle.

7. The method according to claim 6, further comprising: checking a status of the autonomously operated vehicle with respect to (i) another booking, (ii) a remaining range of the autonomously operated vehicle, and/or (iii) a user criteria, wherein the travel route is determined by the electronic management system as a function of the vehicle status and/or the user criteria.

8. The method according to claim 6, further comprising: continuously or periodically checking, by the electronic management system, while the autonomously operated vehicle is negotiating the travel route, whether an alternative transfer point to another alternative transportation source is available, as a function of a respective current position of the autonomously operated vehicle, so as to be able to reach the destination point using the alternative transportation source.

9. The method according to claim 1, further comprising: generating, via the electronic management system, alternative routes for reaching the destination point, wherein each alternative route comprises a planned or actual arrival time, and wherein the electronic management system automatically determines (i) a travel duration, (ii) a travel path, and/or (iii) a deviation of the planned or actual arrival time at the destination point from a previously determined arrival time at the destination point using the alternative transportation source.

10. A system for checking a transport journey of a user, comprising:
- network-based communication configured to communicate with one or more autonomously operated vehicles; and
- an electronic management system, comprising a processing unit and a memory, operatively coupled for network-based communication, wherein the electronic management system is configured to
- receive a transport journey booking for a future pick-up time at a starting point to a destination point for one of the one or more autonomously operated vehicles;
- determine a planned completion of a first route portion of the transport journey, which extends from the starting point to a transfer point for one of the one or more autonomously operated vehicles;
- determine a planned completion of a second route portion of the transfer journey, which extends from the transfer point to the destination point for the one of the one or more autonomously operated vehicles;
- determine, after the planning completion of the first and second route portions, whether the completion of the planned second route portion can be carried out by an alternative transportation source, starting at the transfer point; and
- activate the one of the one or more autonomously operated vehicles to operate using the transport journey booking, wherein the one of the one or more autonomously operated vehicles is configured to continue the transport journey toward the destination point if the alternative transportation source is not available at a point in time prior to the transfer point being reached.

11. The system according to claim 10, wherein the electronic management system is configured to recognize, at the point in time prior to the transfer point being reached, that the alternative transportation source is not available, and generate, in response, alternative routes as a function of a current travel status of the autonomously operated vehicle at the point in time when the unavailability of the alternative transportation source is recognized.

12. The system according to claim 11, wherein the electronic management system is configured to:
- determine, after the transport journey has been booked and before the transport journey has been started, that the alternative routes of transportation are not available at the transfer point; and
- determine an alternative route to the destination point that is independent of the first route portion and the second route portion, wherein the alternative route can be completed entirely via the autonomously operated vehicle.

13. The system according to claim 12, wherein the electronic management system is configured to activate the autonomously operated vehicle to operate using the alternative route.

14. The system according to claim 11, wherein the electronic management system is configured to determine the alternative routes as the function of the current travel status of the autonomously operated vehicle at the point in time when the unavailability of the alternative transportation source is recognized.

15. The system according to claim 14, wherein the electronic management system is configured to determine a travel route from the current travel status to the destination point via the electronic management system, wherein the travel route is configured to be implemented entirely via the autonomously operated vehicle.

16. The system according to claim 15, wherein the electronic management system is configured to check a status of the autonomously operated vehicle with respect to (i) another booking, (ii) a remaining range of the autonomously operated vehicle, and/or (iii) a user criteria, wherein the travel route is determined by the electronic management system as a function of the vehicle status and/or the user criteria.

17. The system according to claim 15, wherein the electronic management system is configured to continuously or periodically check, while the autonomously operated vehicle is negotiating the travel route, whether an alternative transfer point to another alternative transportation source is available, as a function of a current position of the autonomously operated vehicle, so as to be able to reach the destination point using the alternative transportation source.

18. The system according to claim 10, wherein the electronic management system is configured to generate alternative routes for reaching the destination point, wherein each alternative route comprises a planned or actual arrival time, and wherein the electronic management system automatically determines (i) a travel duration, (ii) a travel path, and/or (iii) a deviation of the planned or actual arrival time from a previously determined arrival time at the destination point using the alternative transportation source.

19. A system for checking a transport journey of a user, comprising:
- network-based communication configured to communicate via wireless or wired connections with one or more autonomously operated vehicles; and
- an electronic management system, comprising a processing unit and a memory, operatively coupled for network-based communication,
- wherein the electronic management system is configured to
  - receive a transport journey booking for a future pick-up time at a starting point to a destination point for one of the one or more autonomously operated vehicles;
  - determine a planned completion of a first route portion of the transport journey, which extends from the starting point to a transfer point for one of the one or more autonomously operated vehicles;
  - determine a planned completion of a second route portion of the transfer journey, which extends from the transfer point to the destination point for the one of the one or more autonomously operated vehicles;
  - determine, at least at a point in time after the planning completion of the first and second route portions, whether the completion of the planned second route portion can be carried out by an alternative transportation source, starting at the transfer point; and
  - activate the one of the one or more autonomously operated vehicles to operate using the transport journey booking, wherein the one of the one or more autonomously operated vehicles is configured to continue the transport journey toward the destination point if the alternative transportation source is not available at the transfer point; and
  - recognize, at a point in time prior to the transfer point being reached, that the alternative transportation source is not available, and generate, in response, alternative routes via the electronic management system as a function of a current travel status of the autonomously operated vehicle at the point in time when the unavailability of the alternative transportation source is recognized.

20. The system according to claim 19, wherein the electronic management system is configured to:
- determine, after the transport journey has been booked and before the transport journey has been started, that the alternative routes of transportation are not available at the transfer point; and
- determine an alternative route to the destination point, independent of the first route portion and the second route portion wherein the alternative route is configured to be completed entirely via the autonomously operated vehicle.

* * * * *